United States Patent
Buchholz et al.

(10) Patent No.: US 8,231,763 B2
(45) Date of Patent: Jul. 31, 2012

(54) WOOD COMPOSITION CONTAINING OLEFINS, USE OF OLEFINS FOR RENDERING RAW WOOD MATERIALS WATER REPELLENT, AND METHOD FOR THE PRODUCTION OF WOOD MATERIALS

(76) Inventors: Thomas Buchholz, Reppemstedt (DE); Gernot Meyer, Rosengarten (DE); Marc Prüsmann, Winsen (DE)

( * ) Notice: Subject to any disclaimer, the term of this patent is extended or adjusted under 35 U.S.C. 154(b) by 45 days.

(21) Appl. No.: 12/918,235

(22) PCT Filed: Feb. 25, 2009

(86) PCT No.: PCT/DE2009/000252
§ 371 (c)(1), (2), (4) Date: Nov. 8, 2010

(87) PCT Pub. No.: WO2009/106052
PCT Pub. Date: Sep. 3, 2009

(65) Prior Publication Data
US 2011/0042021 A1    Feb. 24, 2011

(30) Foreign Application Priority Data

Feb. 26, 2008 (DE) .................. 10 2008 011 163

(51) Int. Cl.
*C08L 97/02* (2006.01)
*B27N 3/00* (2006.01)
*D21H 17/04* (2006.01)
*D21H 17/60* (2006.01)

(52) U.S. Cl. ............ 162/172; 162/10; 162/13; 162/142; 162/150; 162/173; 106/2; 106/14.26; 106/14.34; 106/14.41; 106/164.01; 106/164.42; 106/217.8; 106/230; 106/234; 156/62.2; 428/292.4; 428/326; 428/364; 428/402

(58) Field of Classification Search ........... 106/2, 14.26, 106/14.34, 14, 41, 164.01, 164.42, 217.8, 106/230, 234, 285; 162/10.13, 172, 173, 162/218–228, 142, 150; 428/292.4, 326, 428/364, 402
See application file for complete search history.

(56) References Cited

U.S. PATENT DOCUMENTS

| | | | | |
|---|---|---|---|---|
| 3,503,770 A | * | 3/1970 | Coover, Jr. et al. | 428/339 |
| 4,265,663 A | * | 5/1981 | Gilicinski et al. | 106/10 |
| 4,404,239 A | | 9/1983 | Grunewalder | |
| 5,346,943 A | * | 9/1994 | Khungar et al. | 524/398 |
| 2009/0194004 A1 | | 8/2009 | Meyer et al. | |

FOREIGN PATENT DOCUMENTS

| | | |
|---|---|---|
| CA | 2647940 | 9/2008 |
| DE | 102004041032 | 10/2005 |
| DE | 102005029740 A1 | 12/2006 |
| DE | 102007024261 | 11/2008 |
| EP | 1203647 A | 5/2002 |
| EP | 1448 345 B1 | 8/2004 |
| GB | 1367902 | 11/1970 |
| GB | 1353873 | 5/1974 |
| WO | WO 2007/115534 | 10/2007 |
| WO | WO 2008/141635 | 11/2008 |

OTHER PUBLICATIONS

E. Roffael, et al. Hydrophobierung von Spanplatten mit Paraffin, Part 1 Adhasion, 11 (1982), S. 10-19.
May, et al. Hydrophobierung von Spanplatten mit Paraffin, Part 4 Adhasion, 28 (1,2), 17-21, (1984).

* cited by examiner

*Primary Examiner* — Eric Hug
*Assistant Examiner* — Peter Chin
(74) *Attorney, Agent, or Firm* — Bushman & Associates, P.C.

(57) ABSTRACT

The invention relates to a wood composition containing olefin and raw wood materials, the use of said olefins for rendering raw wood materials water repellent, and a method for producing wood materials therefrom. The raw wood materials contain or are made of lignocellulose and are provided in the form of fibers, strands, or chips.

22 Claims, No Drawings

WOOD COMPOSITION CONTAINING OLEFINS, USE OF OLEFINS FOR RENDERING RAW WOOD MATERIALS WATER REPELLENT, AND METHOD FOR THE PRODUCTION OF WOOD MATERIALS

The invention relates to wood compositions containing olefins and wood raw materials and the use of olefins for making wood raw materials as well as the wood materials obtainable therefrom water repellent. The wood raw materials contain and/or consist of lignocelluloses and are in the form of fibers, strands or chips.

It is often desirable to reduce the water uptake and swelling tendency of wood materials such as particle boards, fiber boards and OSB (oriented strand boards). According to the standards in effect in Europe, fiber boards (DIN EN 622) or particle boards (DIN EN 312) must conform to certain limit values for swelling and thickness in underwater storage and for water uptake. To meet the required limit values, the absorbent wood raw materials, such as strands, chips or fibers from which the wood materials are produced must be provided with waterproofing agents in the production process. The wood materials are produced as further processing products by joining the wood raw materials, e.g., by thermal setting, pressing or gluing of the strands, chips, and/or fibers using suitable binders.

The use of paraffin waxes in and/or on such wood raw materials as waterproofing agents, also in the form of aqueous dispersions, is known per se. For example, waterproofing of wood raw materials using Fischer-Tropsch paraffins according to EP 1 448 345 B1 can be mentioned. A number of studies are known for waterproofing of wood materials comprising lignocelluloses with paraffins. For example, reference may be made here to the article by E. Roffael, E. Schriever and H. A. May "Waterproofing Particle Board with Paraffin," Part 1 in *Adhäsion*, 11 (1982), pp. 10-19, and the publication by H. A. May and E. Roffael "Waterproofing Particle Boards with Paraffins," Part 4 in *Adhäsion*, 28, (1, 2), pp. 17-21. In addition, it is known that the waterproofing effect of paraffin waxes can be improved by adding additives such as esterified aliphatic polycyclic carboxylic acids (DE 102007024261).

The object of the present invention is to provide a waterproofing agent which will have a better waterproofing effect with the same amount of additive in comparison with traditional waterproofing agents and/or will necessitate a reduced concentration of waterproofing agent while achieving the same waterproofing effect. This object is achieved by the claimed composition, the inventive use of the claimed composition and/or by wood raw materials treated accordingly, as in the respective independent claims. Preferred embodiments are the subject of the dependent claims or are described below.

The wood composition contains olefins, which are hydrocarbons that are solid at temperatures above 10° C. and in particular above 20° C. (room temperature), having an average carbon chain length of 24 to 50 carbon atoms. The olefins used according to the present invention have solidification points of less than 80° C. Hydrocarbons in the sense of the present intention are compounds consisting exclusively of carbon and hydrogen.

The olefins may have an isomer content, for example, those with branching and/or internal double-bonds. Linear olefins in the sense of the present invention are olefins which do not have any branches on the saturated carbon chain(s). In this sense, more than 70 wt % of the olefins are preferably linear, in particular more than 80%. Thus, in the sense of the present invention, vinylidenes and internal olefins may be linear olefins as long as their saturated carbon atoms do not have any tertiary or quaternary carbon atoms. Vinylidenes are olefins which are substituted on one of the two double-bond carbon atoms with two saturated carbon atoms and do not have any carbon atoms on the other double-bond carbon. The vinylidene content of the olefins may be from 0 to 50 wt % and/or from 10 to 50 wt %.

The olefins used according to the present invention are preferably ethylene oligomerization products. Therefore, the olefins that are used generally have an even number of carbon atoms. In contrast with that, paraffins contain even-numbered and odd-numbered hydrocarbons side by side.

Paraffins have only saturated hydrocarbons. The olefins used according to the invention are usually free of cyclic hydrocarbons as an additional difference.

Alpha-olefins are preferred for use here. The olefins preferably contain more than 50 wt % alpha-olefins, in particular more than 70 wt %. According to an especially preferred embodiment, the olefins preferably contain more than 50 wt %, especially more than 70 wt %, n-alpha-olefins (linear alpha-olefins).

The molecular weights of the olefins are preferably less than 1000 g/mol, or based on the average molecular weight, less than 700 g/mol, and the solidification points of the olefin compositions containing additional waxes are preferably less than 80° C.

The suitability of the olefins for waterproofing wood raw materials is even more surprising since it has generally been assumed in the technical world that olefins, in particular alpha-olefins, are more hydrophilic than paraffins having the same chain length. It was therefore to be expected that the waterproofing effect of these would be inferior to that of comparable paraffins, in particular in mixtures with same.

Like homogeneous paraffin waxes, the olefins that are used have a certain crystallinity, which can be detected by a defined phase transition and/or by measuring the enthalpy of melting by means of DSC.

The olefins that are used are not resins. Resins are non-homogeneous mixtures having an amorphous structure and a vitreous character. They usually melt over a wide temperature range. In contrast with resins, the olefins used according to the invention have a viscosity of less than 20 mm$^2$/s at 100° C. (kinematic viscosity measured according to ASTM D 445), in particular less than 15 mm$^2$/s at 100° C. The olefins are milky to opaque as solids in particular.

Manufacturers of especially suitable alpha-olefins include Chevron Phillips, Shell, INEOS (ex BP). A suitable product is, for example, the C24 to C28 or C30+ cut of linear alpha-olefins (LAO) from the company Chevron Phillips.

The composition preferably also contains paraffin waxes, in particular petroleum-based paraffin waxes, soft waxes, Fischer-Tropsch paraffins or mixtures or refined products thereof. The different types are explained below.

Long-chain saturated aliphatic hydrocarbons are referred to as paraffin waxes. Suitable paraffin waxes that are customarily used in the industry are products of petroleum refining and consist mainly of mixtures of n-alkanes and isoalkanes that are solid at temperatures above 40° C. in various quantity ratios.

Soft waxes are also products of petroleum refining and have oil contents of more than 20 wt % and solidification points higher than 10° C., in particular greater than or equal to 20° C. The oil fraction contained therein is liquid at less than 10° C.

The paraffin waxes that may be used may be divided into macrocrystalline and microcrystalline waxes. Macro-crystalline waxes preferably consist of saturated, linear, unbranched hydrocarbons (n-alkanes) and have a molecular weight between approximately 280 and 700 g/mol (average number of carbon atoms in the chain between 20 and approximately 50).

In contrast with the macrocrystalline paraffins, the microcrystalline paraffins consist primarily of branched alkanes (isoalkanes) and saturated cyclic hydrocarbons (cyclo-alkanes). The melting range is between 60° C. and 90° C. Microcrystalline paraffins are also accessible by hydroisomerization of Fischer-Tropsch waxes.

The olefins (a) that are used, preferably the olefins plus the paraffin waxes (b) and in particular the wax composition containing the olefins and the paraffin waxes plus optionally additional waxes (c) preferably constitute 0.1 to 5 wt %, in particular 0.5 to 2.5 wt % of the wood composition, based on the dry weight of the wood materials (=100 wt %).

The composition used according to the present invention may also be used in the form of a dispersion. The inventive dispersions contain:
  less than 80 wt % to 30 wt % water as a continuous phase,
  more than 0.1 to 10 wt %, preferably 1 to 5 wt % of at least one emulsifier,
  more than 20 to 80 wt % waxes, comprising the olefins used according to the invention and forming the disperse phase,
as well as optionally other substances. The continuous phase of the wax dispersion is water, the discontinuous phase is the wax, where the wax consists essentially, preferably completely, of long-chain hydrocarbons.

If the compositions containing olefins are used in the form of dispersions, it is especially preferable for carboxylamides (0.1 to 10 wt %, based on the dispersion) such as urea and/or mineral oils that are liquid at room temperature (0.1 to 10 wt %, based on the dispersion) to also be used because the emulsifiability of the wax phase is improved in this way.

The emulsifier preferably comprises or consists of one or more anionic emulsifiers which may be fatty acids, saponified fatty acids and/or fatty acid derivatives having carboxyl groups, optionally saponified. The dispersion is stabilized with an emulsifier. Emulsifiers are surface-active amphoteric substances or high-molecular substances. The emulsifier may be anionic, cationic, nonionic or may have a betaine structure, preferably anionic. Emulsifiers that can be mentioned include:
  alcohol polyethylene glycol ethers, e.g., those of the general formula R—O—(R$^1$—O)$_n$—H,
  fatty acid ester polyethylene glycol ethers, e.g., those of the general formula R—COO—(R$^1$—O)$_n$—H,
  alkylpolyalkylene glycol ether carboxylic acids, e.g., those of the general formula R—O—(R$^1$—O)$_n$—CH$_2$—COOH and/or their alkanolammonium salts, alkali metal salts or alkaline earth metal salts,
  alkylamidoalkylbetaines, for example, those of the general formula R—CONH(CH$_2$)$_n$N$^+$(CH$_3$)CH$_2$—COO$^-$,
  amine oxides, e.g., those of the general formula R—NO(CH$_3$)$_2$,
wherein
  R denotes a branched or linear, saturated or unsaturated C$_8$ to C$_{20}$ and/or C$_7$ to C$_{19}$ hydrocarbon radical,
  n is a number from 2 to 20,
  R$^1$ is an alkylene radical having 2 to 4 hydrocarbons, e.g., C$_2$H$_4$ and/or C$_3$H$_6$, optionally different for each n (including the block structure), and
  u is a number from 1 to 10, products from the alkoxylation of triglycerides, which are esterified entirely or partially with C$_6$ to C$_{22}$ fatty acids, where 2 to 40 mol alkoxylating agent are used per mol triglyceride,
partially neutralized partial glycerides of monovalent or polyvalent C2 to C22 carboxylic acids, in particular C8 to C22 carboxylic acids, such as linoleic acid, stearic acid, isostearic acid, palmitic acid, lauric acid, caprylic acid, capric acid, citric acid and/or lactic acid,
esters/partial esters of polyglycerol, where the carboxylic acid group preferably has 2 to 22 carbon atoms,
C6 to C32 carboxylic acids, in particular C8 to C26 fatty acids, completely or partially saponified, in particular completely saponified, e.g., with amines or amine compounds such as diethanolamine.

Emulsifiers in these sense of the present invention may also be high-molecular substances such as gum arabic, gum ghatti or cellulose compounds.

Emulsifier mixtures, e.g., an anionic emulsifier and a nonionic emulsifier or an anionic emulsifier and a high-molecular emulsifier are also possible. The emulsifiers are added in amounts of 0.5 to 10 wt %, in particular 1 to 5 wt %, based on the total composition. Anionic emulsifiers are preferred, in particular exclusively anionic emulsifiers (i.e., no other surfactants or emulsifiers and/or if wt % amounts are given in this regard, they refer to the sum of emulsifiers and surfactants).

The emulsification process is usually divided into the following sections: premixing the individual components to form a coarsely dispersed free emulsion (premix) and fine emulsion by breaking up the droplets by the emulsifier when the critical deformation is exceeded and the newly formed phase boundaries are stabilized.

The composition used according to the invention is added to the wood raw materials based on strands, chips or fibers in the form of a melt or a dispersion with water as the continuous phase to induce waterproofing of the wood materials prepared from them, in particular in the form of plates, and especially to reduce the uptake of water and the resulting swelling. The waterproofing should help to counteract a reduction in mechanical strength under the influence of moisture and to prevent expansion of length or thickness at higher ambient moisture levels.

The olefins, preferably with the addition of paraffin waxes, delay the uptake of water and slow the swelling in thickness in underwater storage. In addition to the actual waterproofing effect, these compositions also improve the sliding properties of the chips, strands or fibers. This has a positive effect on the pumpabilty and dispersability of the chips, strands or fibers.

Direct application of the heated, molten composition has the advantage of reducing the use of emulsifiers and, if necessary, additional stabilizers and eliminates the need for adding water in comparison with aqueous dispersions. The emulsifier usually counteracts the waterproofing effect. The requirement of heated line systems and metering systems may be a disadvantage. In the present case, the composition may also be applied to the chips in the form of an aqueous dispersion. The wax dispersions may be sprayed in the form of a mixture with the binder or applied separately to the chips, strands or fibers before or after addition of the binder. The composition should have little or no effect on the setup of the glues used for the cover layer and/or middle layer. Binders that are conventionally used are acid-curing urea-formaldehyde resins, alkali-curing phenol-formaldehyde resins, isocyanates, e.g., in the form of prepolymers such as PMDI (polymeric diphenylmethane diisocyanate) or tannin-formaldehyde resins.

DESCRIPTION OF EXPERIMENT

Experimental Parameters:

| | |
|---|---|
| Plates produced: | 2 plates per variant |
| Dimensions: | 60 cm × 45 cm |
| Ideal thickness: | 14.5 mm after grinding |
| Ideal gross density: | 0.75 g/cm³ |
| Pressing temperature: | 200° C. |
| Pressing time: | 20 s/mm |
| Fiber material: | thermomechanical pulp (TMP) |
| Waterproofing agent: | |
| Variant 1: | Paraffin-wax dispersion with a solidification point of the wax phase of 53° C. and a MEK-soluble fraction of 21.5% (ASTM D 3235) |
| Variant 2: | Wax dispersion; like variant 1, but with 10 wt % of the paraffin waxes replaced by C30+ alpha-olefins |
| Solids content of the dispersion: | 60 wt % |
| Binder: | BASF Kaurit 350, 10% solids, based on absolutely dry fiber pulp |
| Curing accelerator: | ammonium sulfate (40% solution) 2% solids based on solid resin |
| Solids content of the dispersion based on wood raw materials dry solids: | 0.25 wt % |

Experimental Procedure:
1) Applying the waterproofing agent together with the binder to the fiber
2) Dispersing the glued fibers to form a fiber mat
3) Pressing the MDF
4) Grinding and seaming the MDF
5) Storage of the plates for one week in a standard climate (20° C., 65% relative atmospheric humidity according to DIN 50014)
6) Cutting out test samples
7) Determining the physical and technological properties Measurement Methods (cf. reference to the DIN methods in DIN EN 622)

| | |
|---|---|
| Thickness swelling (2 h and 24 h) | Water uptake (2 h and 24 h) |
| Edge swelling (2 h and 24 h) | Transverse tensile strength |

Results:

| Test | Variant 1* | Variant 2 |
|---|---|---|
| Water uptake 2 h (%) | 72.4 | 66.8 |
| Water uptake 24 h (%) | 102.2 | 98.5 |
| Thickness swelling 2 h (%) | 21.4 | 19.1 |
| Thickness swelling 24 h (%) | 39.9 | 38 |
| Edge swelling 2 h (%) | 21.68 | 19.11 |
| Edge swelling 24 h (%) | 36.07 | 33.63 |
| Transverse tensile strength (N/mm²) | | no change |

(*comparative test)

The invention claimed is:

1. A wood composition, comprising
wood raw materials from lignocelluloses in the form of chips, strands or fibers, and
olefins with an average of 24 to 50 carbon atoms, wherein
more than 50 mol % of the olefins are alpha-olefins,
the olefins have a maximum of the distribution between 24 and 40 carbon atoms, and
based on the dry weight of the wood materials,
0.1 to 5 wt % olefins,
0.1 to 5 wt % of a wax composition, comprising paraffin waxes in the form of long-chain saturated hydrocarbons, the weight ratio of the paraffin waxes to the olefins being 1:30 to 20:1,
are contained in the wood material composition.

2. The wood composition according to claim 1, characterized in that the olefins are solid at a temperature above 10° C. and have a solidification point of less than 80° C.

3. The wood composition according to claim 1, characterized in that more than 70 mol % of the olefins are linear.

4. The wood composition according to claim 1, characterized in that more than 70 mol % of the olefins are alpha-olefins.

5. The wood composition according to claim 1, characterized in that more than 50 mol % of the olefins are linear alpha-olefins.

6. The wood composition according to claim 1, characterized in that the olefins have an average of 26 to 40 carbon atoms.

7. The wood composition according to claim 1, characterized in that more than 70 wt % of the olefins are even-numbered.

8. The wood composition according to claim 1, characterized in that the weight ratio of the paraffin waxes to the olefins is 1:20 to 5:1 in the wax composition.

9. The wood composition according to claim 1, characterized in that the paraffin waxes are Fischer-Tropsch paraffins, soft waxes, paraffin waxes obtained from petroleum refining and mixtures thereof.

10. The wood composition according to claim 1, characterized in that more than 60 wt % of the long-chain saturated hydrocarbons are n-alkanes.

11. The wood composition according to claim 1, characterized in that the wax composition containing the paraffin waxes and the olefins has a solidification point of greater than 40° C. to less than 90° C.

12. The wood composition according to claim 1, characterized in that, based on the dry weight of the wood materials, 0.5 to 2.5 wt % olefins are used.

13. A method of hydrophobizing wood raw materials from lignocelluloses in the form of chips, strands or fibers, yielding a wood composition, characterized in contacting the raw wood materials with olefins containing an average of 24 to 50 carbon atoms, wherein
more than 50 mol % of the olefins are alpha-olefins,
the olefins have a maximum of the distribution between 24 and 40 carbon atoms, and
based on the dry weight of the wood materials,
0.1 to 5 wt % olefins,
0.1 to 5 wt % of a wax composition, comprising paraffin waxes in the form of long-chain saturated hydrocarbons, the weight ratio of the paraffin waxes to the olefins being from 1:30 to 20:1,
are contained in the wood material composition.

14. The method according to claim 13, characterized in that the olefins and paraffin waxes, are applied to the wood raw materials by melting or by spraying.

15. The method according to claim 13, characterized in that the olefins and paraffin waxes are applied to the wood raw materials in the form of an aqueous dispersion.

16. The method according to claim 15, characterized in that the dispersion has average particle sizes of less than 1 μm, in particular less than 150 nm.

17. The method according to claim 15, characterized in that the dispersion also contains carboxylamides.

18. The method according to claim 15, characterized in that the dispersion also contains mineral oils that are liquid at room temperature.

19. A method for manufacturing moderately dense fiber boards, high-density fiber boards, OSB (oriented strand boards) or chip boards comprising adding a binder to the wood composition according to claim 1 and forming said boards therefrom.

20. The method according to claim 19, characterized in that, based on the dry weight of the wood materials, 0.1 to 2.5 wt % olefins and paraffin waxes, are introduced into the wood material.

21. The method according to claim 19, characterized in that the binder is selected from the group consisting of acid-curing urea-formaldehyde resins, alkali-curing phenol-formaldehyde resins, isocyanates tannin-formaldehyde resins and mixtures thereof.

22. The method according to claim 13, characterized in that, based on the dry weight of the wood materials, 0.1 to 5 wt %, olefins and paraffin waxes are introduced into the wood material.

* * * * *